US009063225B2

(12) United States Patent
Lee et al.

(10) Patent No.: US 9,063,225 B2
(45) Date of Patent: Jun. 23, 2015

(54) HIGH RESOLUTION DOPPLER COLLISION AVOIDANCE RADAR

(75) Inventors: Jae Seung Lee, Ann Arbor, MI (US);
Paul Donald Schmalenberg, Ann Arbor, MI (US); James Paul Ebling, Ann Arbor, MI (US); Nikola Stevan Subotic, Ann Arbor, MI (US)

(73) Assignees: Toyota Motor Engineering & Manufacturing North America, Inc., Erlanger, KY (US); Michigan Technological University, Houghton, MI (US)

( * ) Notice: Subject to any disclaimer, the term of this patent is extended or adjusted under 35 U.S.C. 154(b) by 421 days.

(21) Appl. No.: 13/414,299

(22) Filed: Mar. 7, 2012

(65) Prior Publication Data
US 2013/0234880 A1 Sep. 12, 2013

(51) Int. Cl.
*G01S 13/58* (2006.01)
*G01S 13/34* (2006.01)
*G01S 13/93* (2006.01)
*G01S 13/536* (2006.01)

(52) U.S. Cl.
CPC ............. *G01S 13/345* (2013.01); *G01S 13/536* (2013.01); *G01S 13/584* (2013.01); *G01S 13/931* (2013.01); *G01S 2013/9375* (2013.01)

(58) Field of Classification Search
CPC ..... G01S 13/34; G01S 13/931; G01S 13/345; G01S 13/536; G01S 13/584; G01S 2013/9375
USPC ........................................................ 342/70, 109
See application file for complete search history.

(56) References Cited

U.S. PATENT DOCUMENTS

| 7,598,848 | B2 | 10/2009 | Takagi et al. |
| 7,974,442 | B2 | 7/2011 | Camus et al. |
| 2002/0036584 | A1* | 3/2002 | Jocoy et al. ................. 342/70 |
| 2004/0252047 | A1* | 12/2004 | Miyake et al. .............. 342/107 |
| 2010/0039311 | A1* | 2/2010 | Woodington et al. .......... 342/70 |
| 2010/0103023 | A1* | 4/2010 | Ogawa ............................ 342/59 |

FOREIGN PATENT DOCUMENTS

JP 2007-51888 A 8/2005

* cited by examiner

*Primary Examiner* — Timothy A Brainard
(74) *Attorney, Agent, or Firm* — Gifford, Krass, Sprinkle, Anderson & Citkowski, P.C.

(57) ABSTRACT

An example radar apparatus has a transmission frequency modulated by a chirp waveform having three chirp segments, including increasing, decreasing, and a constant frequency segments. The chirp waveform may extend over the full revisit time of the radar beam. The frequency difference between the transmitted and echo signals are determined at least once per chirp segment. Example apparatus include a Doppler radar for vehicle use.

9 Claims, 4 Drawing Sheets

HIGH RESOLUTION DOPPLER COLLISION AVOIDANCE RADAR

FIELD OF THE INVENTION

The invention relates to radar apparatus and methods, in particular vehicular Doppler radar.

BACKGROUND OF THE INVENTION

Radar is frequently used in collision avoidance systems, being used to detect collision hazards such as other vehicles. In Doppler radar, a frequency shift due to relative motion of the target is detected. However, the resolution of a conventional continuous-wave Doppler system is typically too low to reliably detect the motion of slow moving obstacles, such as pedestrians. Hence, an improved Doppler collision avoidance radar would find uses in many applications, such as improved vehicular collision avoidance systems.

SUMMARY OF THE INVENTION

Examples of the present invention include improved vehicular radars, in particular improved Doppler radars.

In some examples, a multiple segment chirp waveform is used, allowing resolution of Doppler shift and target distance for multiple targets. In some examples, a three-segment chirp waveform improves the Doppler sensitivity, and may eliminate the requirement for two-dimensional processing on a post-to-post basis.

In some examples, the chirp waveform spans the full revisit rate of the radar signal, providing the required data collection time to produce a fine resolution Doppler measurement.

A sub-sampling scheme may be used in which each successive sample corresponds to a new beam position. The radar system may scan through the field of view through multiple beam positions, with the required revisit times to operate the collision avoidance radar, while preserving the Doppler resolution.

An example radar apparatus includes a chirp signal generator, generating the chirp waveform, and a radar transmitter generating a transmitted beam having a field of view. The chirp signal waveform is received by the transmitter and gives a frequency modulation of the transmitted beam frequency. The transmitted beam, when energized, induces an echo signal having an echo frequency from a target within the field of view. The receiver receives the echo signal, and a frequency difference analyzer measures the frequency difference between the echo frequency and the transmission frequency. An electronic control circuit receives frequency difference data from the frequency difference analyzer, and determines the relative speed and range for the target.

In an example apparatus, the chirp waveform has at least three chirp segments, including an increasing frequency chirp segment (inducing an up-chirp segment in the transmitted beam), a decreasing frequency chirp segment (inducing a down-chirp segment in the transmitted beam), and a constant frequency chirp segment during which the transmitted beam frequency does not change. The frequency difference between the echo signal and the transmission signal are determined at least once per chirp segment, and in some examples a plurality of times per chirp segment to increase Doppler resolution.

Example apparatus include a Doppler radar for vehicle use, in particular a land vehicle use, such as an automobile use. An apparatus may be a continuous-wave Doppler radar apparatus.

In some examples, the transmission frequency increases linearly with time during an increasing frequency chirp segment, decreases linearly with time during a decreasing frequency chirp segment, and does not vary with time during a constant frequency chirp segment.

In some examples, the chirp waveform extends over the entire revisit time of the transmitted beam. The revisit time may be in the range 1 ms 100 ms, such as in the range 10 ms-30 ms, and in particular may be approximately 20 ms.

The apparatus may generate a plurality of multiplexed transmitted beams, each transmitted beam having a transmission frequency that is frequency modulated by the chirp signal, or a time-delayed version thereof. The frequency difference analyzer may determine the frequency difference between the transmission frequency and the associated echo frequency for each transmitted beam during each segment of the chirp signal or a time-delayed version.

DETAILED DESCRIPTION OF THE INVENTION

Figure 1:
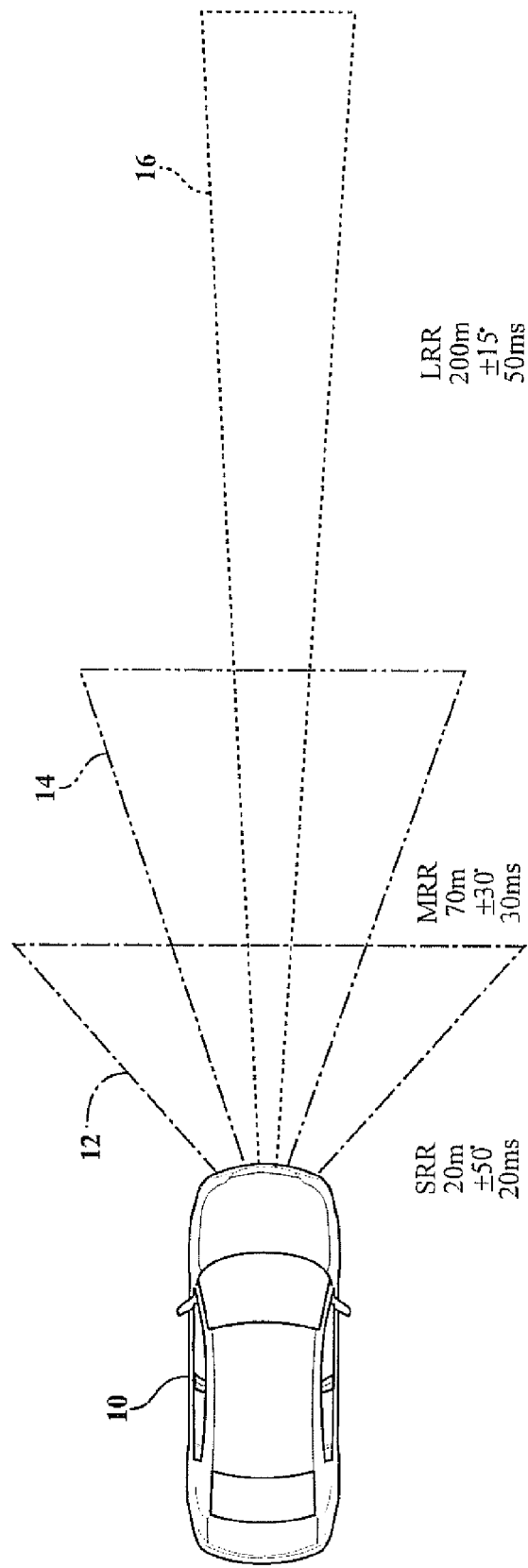
FIG. 1 (prior art) illustrates a vehicle having collision avoidance radar.

Examples of present invention include a Doppler waveform with a sampled radar waveform stretched over multiple beam positions, allowing fine Doppler resolution. In some examples, the waveform allows an improved pedestrian detection and collision avoidance system. Examples also include vehicular radar with improved target separation, allowing improved range and angular resolution based target separation.

As an example, a radar located at the front of the vehicle is considered below, but radar apparatus may be mounted at various positions around a vehicle. The vehicle on which the radar is mounted may be referred to as the subject vehicle. The radar apparatus includes a transmitter, generating a radar frequency which propagates away from the vehicle. The generated frequency may be frequency modulated by a chirp waveform. The term "chirp", as used here, refers to the time-dependence of radar transmission frequency versus time. A simple chirp waveform is a single-segment waveform, which causes the radar frequency to increase steadily as a function of time, e.g. through the duration of a radar pulse.

The transmitted radar signal strikes an object (or "target") in the vehicle environment, within the radar field of view, and a reflected signal (or "echo") is received by the radar apparatus. If the object is has zero radial velocity relative to the subject vehicle, the received signal frequency is the same as the transmitted frequency. As the transmitted frequency varies with time, the received frequency identifies the time at which the corresponding transmitted frequency was generated, and hence the time delay for the radar signal to reach and reflect back from the apparatus. Hence, the range (distance) to the object is identified.

If the object has some radial velocity relative to the subject vehicle, the reflected signal is shifted by the Doppler effect. In a Doppler radar, the Doppler effect is used to determine the relative velocity of a target. However, the Doppler effect is small for slow moving objects in the radar field of view. These may include pedestrians (e.g. for a vehicle pulling away from a stop), or target vehicles having a similar velocity to the subject vehicle.

A present difficulty in collision avoidance radar is the detection and characterization of pedestrians and other slow-moving collision hazards. Major issues include the low relative velocity of the pedestrian relative to the vehicle, and the low signature that the pedestrian presents to the radar. In order to detect the low relative velocity, a fine Doppler resolution is required so that the pedestrian can be differentiated from stationary objects and other moving vehicles.

The Doppler resolution is related to the amount of time that the radar collects data on the target. In a conventional radar waveform, such as a conventional frequency modulated continuous-wave radar, a high pulse repetition chirp is used, followed by processing across multiple pulses to synthesize a fine Doppler resolution. For example, frequency difference signals may be passed through an analog-to-digital converter (if necessary), followed by digital signal processing. However, this approach requires two-dimensional processing which is computationally expensive.

Conventional radar apparatus use a high repetition frequency single-segment chirp pulse, followed by processing across pulses to synthesize a fine Doppler resolution. A simple chirp pulse, however, is Doppler intolerant, requiring that the Doppler signal cannot be measured for an individual pulse and a multiplicity of pulses must be processed over time in order to measure the target Doppler shift.

FIG. 1 (prior art) shows conventional radar applications, in which vehicle 10 has a short range radar (SRR) 12, a medium range radar (MRR) 14 and a long range radar (LRR) 16. A typical radar includes a beam that scans across the field of view, with a field of view update time, or revisit time, as the order tens of milliseconds. For short-range collision warning, a relatively low revisit time is usually desired, such as 20 ms. In FIG. 1, typical revisit values are shown, such as 20 ms for the short range radar, along with typical field of views for the three radar ranges.

Examples of the present invention are not tied specifically to any particular radar type and range, and may in some cases include radars with range up to and better than 200 meters with the simultaneous capability of pedestrian detection.

A radar waveform includes a modulated carrier frequency. For example, a chirp waveform may include a regular increase in radar frequency, relative to the modulated base frequency. A simple chirp waveform has one segment, corresponding to a steady increase in the radar frequency. In a typical waveform in a conventional system, a single segment chirp waveform is used in which the radar frequency increases during the radar pulse. The radar pulse may then be repeated at a later time, the same chirp properties being used for successive pulses. However, a simple chirp pulse is Doppler intolerant, in that the Doppler shift cannot be measured via an individual pulse.

Figure 2A:
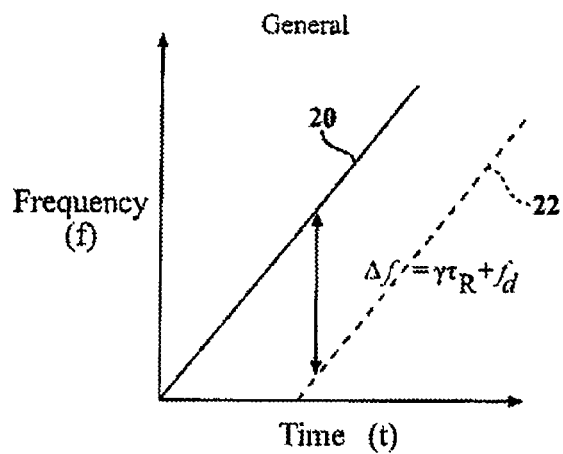
FIGS. 2A-2C illustrate a single segment chirp pulse, with the problem that range and Doppler effects are coupled and cannot be resolved.
Figure 2B:
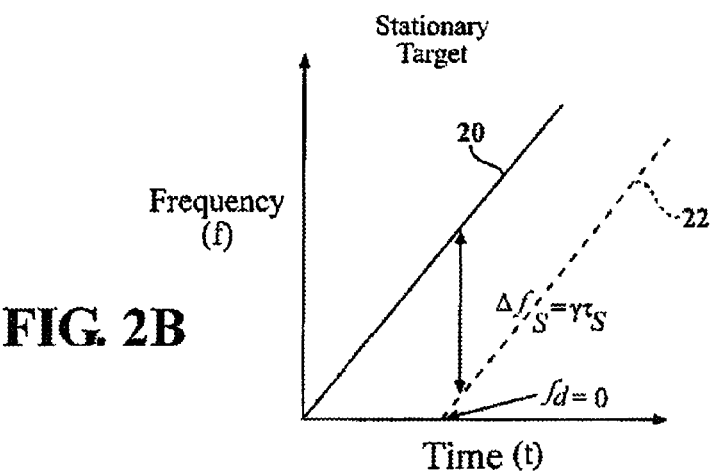
Figure 2C:
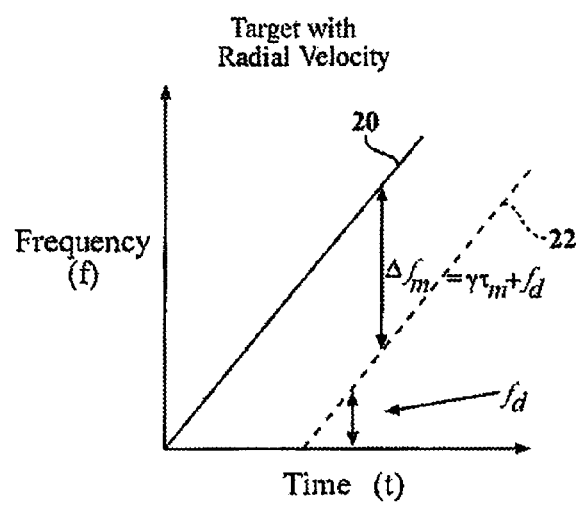

FIGS. 2A-2C illustrate the problem of coupling range and Doppler shifts in a single segment pulse. FIG. 2A shows a general case in which the transmitted signal 20 has a frequency that increases linearly with time over the duration of the pulse. A received signal, or echo, is detected and the frequency of the received echo is shown as dotted line 22. There is a frequency difference $\Delta f$ between main transmitted and received echo pulses, which may include a contribution from the chirp gradient $\gamma$ and/or a Doppler shift $f_d$.

As illustrated in FIGS. 2B and 2C, the same frequency difference can arise from a stationary target with one range, and another target with a significant radial velocity and a different range. FIG. 2B shows the frequency shift as arising from a stationary target, the frequency shift $\Delta f_s$ arising entirely due to the range of the target, $\Delta f_s = \gamma \tau_s$ where is $\tau_s$ the delay time for radar to reach the stationary target and be returned. FIG. 2C shows an identical frequency shift arising from a moving target with radial velocity, the radial velocity increasing the echo frequency by $f_d$, so that $\Delta f_m = \gamma \tau_m + f_d$. Using a single segment chirp pulse, there is no way to distinguish the stationary and moving targets.

In this context, the term "stationary" refers to a target with no radial velocity relative to the radar. If the radar is mounted on a subject vehicle with a given velocity, this interpretation relates to a vehicle having the same velocity.

The frequency shift $f_s$ is due to the time delay between the transmission and reception of the radar signal. During this time delay, the chirp pulse has increased the transmission frequency, so that the received frequency is different from the transmitted frequency at the time of reception, the frequency difference indicating the target range.

A conventional radar may use a single-segment chirp pulse, with a chirp retrace time $t_r$ of 1 microsecond. Assuming 10 beams, a revisit time of 20 ms, a pulse repetition frequency (PRI) of 2 ms, and a delay to maximum range ($R_{max}$=200 m) $\tau$=1.33 microseconds, the best Doppler resolution $B_{dmin}$ is approximately 500.6 Hz, corresponding to a radial velocity of 3.53 kph. This is a somewhat high value for reliable pedestrian detection at low speeds or vehicle pull-away situations, as in this case Doppler data from stationary objects and most pedestrians will be unresolved.

Examples of the present invention include multiple segment chirp pulses. The number of segments of the chirp pulse corresponds to separate periods in which the radar frequency rises, falls, or remains substantially constant. Each segment corresponds to a portion of the transmitted pulse in which the transmission frequency is increasing, decreasing, or remaining substantially unchanged.

In an example approach to resolving the range/Doppler ambiguity, a two segment pulse is used, in which the transmission frequency increases linearly with gradient $\gamma$ during the first segment, and then decreases linearly with gradient $\gamma$ during the second segment. This approach successfully resolves the range/Doppler ambiguity for a single target. For example, if $\Delta f_1$ is the frequency shift in the first (frequency increasing) segment, and $\Delta f_2$ is the frequency shift in the second (frequency decreasing) segment, then it can be readily shown that $\Delta f_1 + \Delta f_2 = 2\gamma \tau$ (giving the range), and $\Delta f_1 - \Delta f_2 = 2 f_d$ (giving the Doppler shift).

Figure 3:
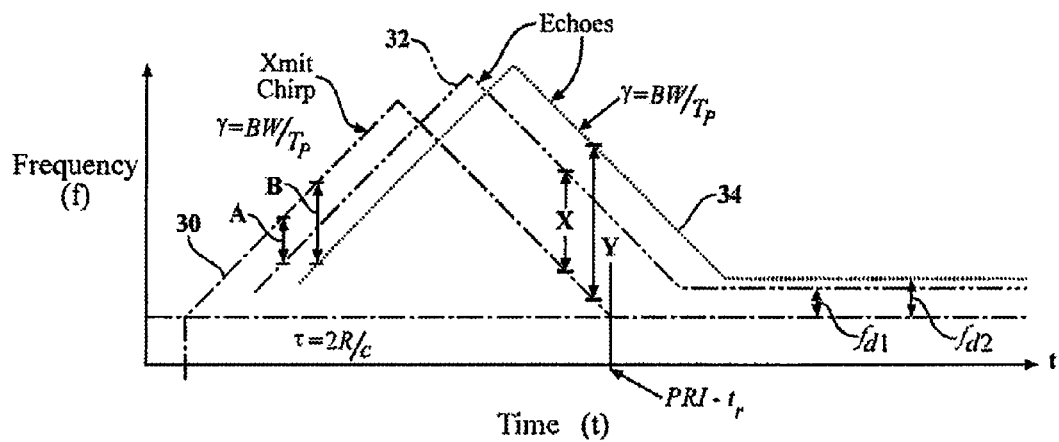
FIG. 3 shows a three segment chirp pulse having a rising frequency segment, a falling frequency segment, and a constant frequency segment.

FIG. 3 illustrates an example three segment transmit (Xmit) chirp pulse 30. A three segment chirp pulse successfully separated out three targets, but does not degrade the Doppler resolution as much as four or more segments. The transmit chirp waveform includes a first segment in which the transmission frequency is increasing, a second segment in which the transmission frequency is decreasing, and a third segment in which the transmission frequency is constant. The transmit frequency and echo frequency are compared at least once during each segment.

FIG. 3 shows echo frequencies at 32 and 34, corresponding to targets within the radar range. For the first target providing echo frequency 32, the frequency difference during the first segment is denoted "A," the frequency difference during the second segment is denoted "X" and the frequency difference during the third segment is denoted $f_{d1}$. Similarly, for the second target the detected frequency differences (between transmit and receive frequencies at a particular time) are denoted "B" during the first segment, "Y" during the second segment and $f_{d2}$ during the third segment. Using these three frequency difference measurements for each target, a frequency difference measurement being during each of the three segments, the range and the Doppler shifts for each target can be resolved.

For example, during the third segment where transmit frequency is essentially constant, the Doppler shift due to radial velocity is apparent. There is no range-induced contribution, as the frequency gradient is zero. The shifts during the first and second segments include contributions from both the Doppler shift (if any) and the target range.

Hence, an improved chirp waveform has at least two segments, and preferably includes three or more segments. A particularly preferred example has three segments. The frequency increases linearly with time during a first segment, decreases linearly with time during a second segment, and remains constant during a third segment. In a representative example, the first and second segments are of similar duration, and have gradients of opposite sign but similar magnitude. In other examples, the order or the segments may be rearranged, for example as rising-constant-falling, falling-rising-constant, falling-constant-rising, or constant-rising-falling, or constant-falling-rising.

In an example chirp waveform, the radar frequency rises from a starting frequency to a maximum frequency as a linear function of time (over the first segment duration), falls from the maximum frequency to the starting frequency as a linear function of time (over the second segment duration), and then remains constant until the end of the revisit time (over the third segment duration).

In general, an N-segment chirp waveform can be used to resolve range/Doppler ambiguities for N-1 targets. For example, four targets can be resolved using a three segment chirp waveform. However, with improved range resolution, the number of targets resolved per beam may exceed four. However, the Doppler resolution is degraded by a factor of N, and using a three segment chirp waveform and a conventional radar operation approach, the velocity of resolution may be in excess of 10 kilometers per hour (kph).

In some examples of the present invention, the Doppler resolution is improved by extending the chirp waveform across the entire time period of the field of view update. A three-segment chirp waveform extends across the entire revisit time of the radar.

Figure 4:
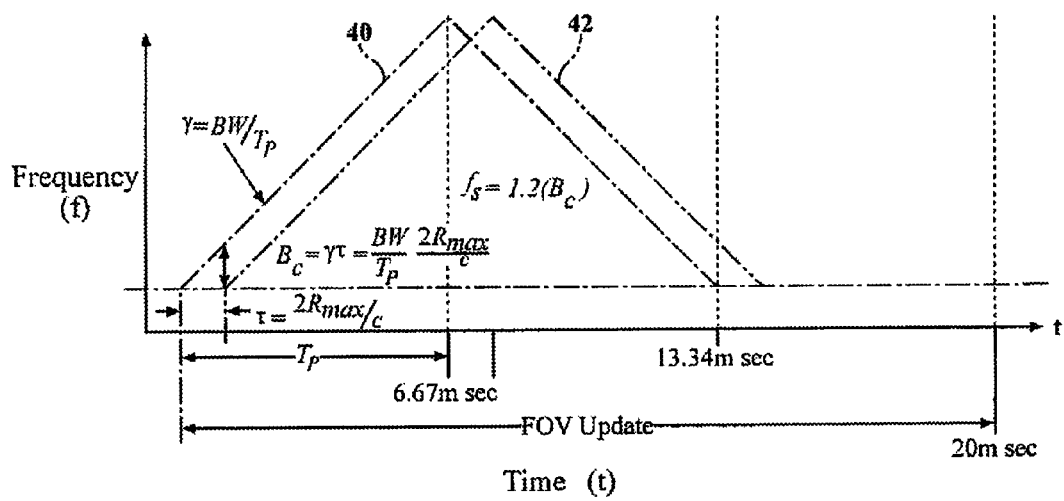
FIG. 4 illustrates stretching the three segment chirp pulse across the entire field of view update time.

FIG. 4 shows the chirp waveform 40 extending over the time period between time (t)=0 and time=20 milliseconds (ms). In this example, the field of view update time is 20 milliseconds, however, this is exemplary and non-limiting. The chirp gradient γ for the first segment is equal to the bandwidth chirp (BW), divided by the first segment duration $T_p$. The bandwidth chirp (BW) may be 1 GHz.

As shown for waveform 40 the frequency rises during the first segment up to t=6.67 milliseconds (ms). falls during the second segment until t=13.34 ms, and then is constant until the end of the time period at t=20 ms. The waveform is then repeated.

FIG. 4 also shows a second chirp waveform 42 starting after a time delay $\tau=2R_{max}/c$ where $R_{max}$ is the maximum radar range and c is the speed of light. The second beam also uses a three segment chirp pulse, similar to the first beam but offset in time. Subsequent beams can be used after similar subsequent delays, up to N beams. In this way, N multiplexed beams can be used. The figure shows the compressed bandwidth Bx, related to time delay t by $B_c=\gamma\tau$, where γ is the chirp slope $BW/T_p$. $T_p$ is the duration of the first segment, in this example 6.67 ms. In this example, the second segment has a similar duration, and the third segment takes up the remainder of the field-of-view update time (in this example, 20 ms).

Figure 5:
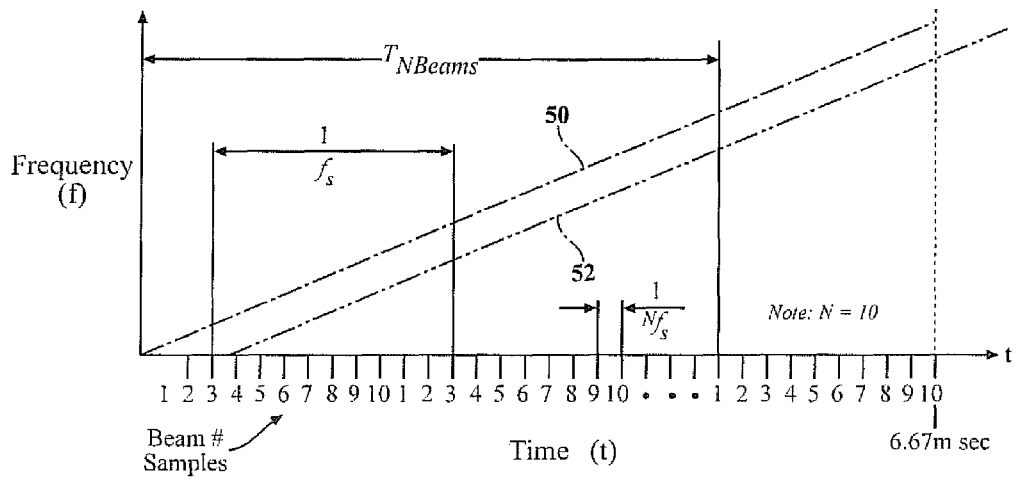
FIG. 5 illustrates beam multiplexing.

FIG. 5 further illustrates the beam multiplexing. In this approach, ten beams are used with the beam sample sequence repeating at the frequency $f_s$. Any given beam is sampled every $1/f_s$ seconds. The beam sample numbers are shown along the time axis. Lines 50 and 52 illustrate the frequency behavior of two exemplary beams. The time delay between each beam is $1/(N f_s)$.

FIG. 5 shows multiple beams, in this example N beams where N=10, can be multiplexed during the first segment of the chirp waveform, which ends at the time of 6.67 milliseconds as shown on the lower right, and corresponding to the end of first segment of the chirp waveform shown in FIG. 4. The figure shows that each beam can be read multiple times during this chirp segment duration. There may be the same number of samples per beam as for the case of a single beam, allowing the single beam range resolution to be maintained for the multiple beam case. This has significant advantages.

Figure 6:
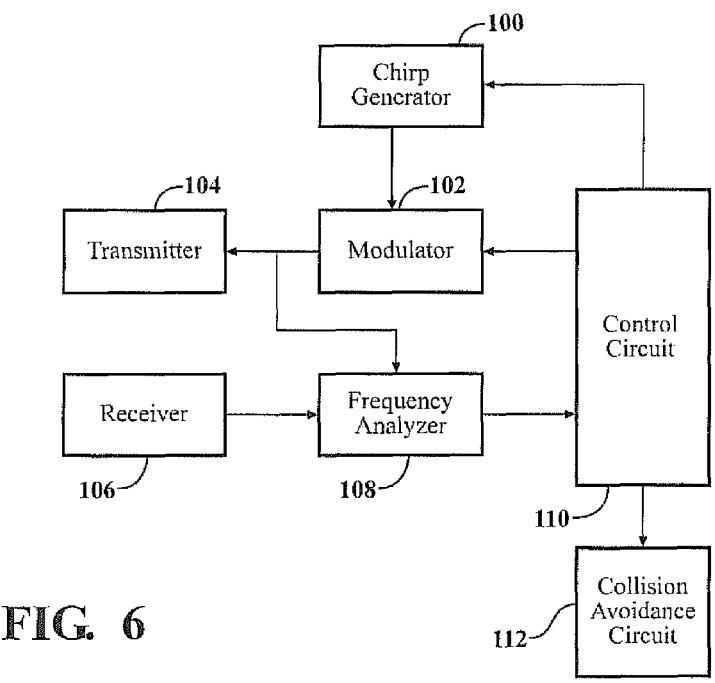
FIG. 6 is a simplified schematic of an example apparatus.

FIG. 6 shows a simplified schematic, including chirp generator 100 generating a chirp waveform used to frequency modulate the transmission frequency using modulator 102. The transmitter 104 generates a transmitted beam (not shown for clarity), and receiver 106 receives the echo signal (not shown). A frequency difference analyzer 108 determines frequency difference data at least once for each beam (if more than one), for each chirp waveform segment. An electronic circuit (control and analysis circuit 110) determines range and Doppler shift values for targets using the frequency difference data. Such data may be output to a vehicle collision avoidance system 112. Vehicle control inputs may be provided to avoid collisions with obstacles within the vehicle environment. A vehicle may have multiple radar apparatus, and a radar apparatus may generate multiple transmission beams.

Some exemplary values are now determined for illustrative purposes, but these are not limiting. For an example vehicular radar, the maximum range $R_{max}$ may be set at 200 meters, in which case the time period τ (shown in FIG. 4)=$2R_{max}/c$=1.33 microseconds, where c is the speed of light. The compressed bandwidth for a 1 GHz bandwidth (BW) chirp, $B_c=\gamma\tau\approx200$ kHz, where $\gamma=BW/T_p$. The IF bandwidth $B_n=B_c+B_d$, and is about 235 kHz. The sampling frequency $f_s=1.2B_n$ (the IF bandwidth)≈283 KHz. In that case, the number of samples per beam is $N_s=f_sT_p$ or 1.888 samples. To sample N beams in the same time, the sampling frequency is the single beam sampling rate multiplied by N, while switching across beam positions, and for N=10 beams we find N fs=2.83 MHz.

Every Nth sample is from one particular beam position, and each beam position is adequately sampled for the original compressed IF bandwidth. The range resolution is preserved, and the range is adequately spatially sampled within each beam. The same number of samples per beam is obtained as would be the case if only one beam were generated during each segment.

Each beam is sampled for a time duration within each segment of approximately $T_{NBeams}\approx6.67$ ms, given a Doppler resolution $B_{dmin}$ of approximately $1/T_{NBeams}\approx150$ Hz, corresponding to a radial velocity resolution $v_{min}=(B_{dmin}\lambda)/2$=1.06 kph, where λ is the radar wavelength. This is an excellent resolution, and sufficient for most situations where moving pedestrian detection is required.

For an example radar using the approach shown in FIG. 4, the calculated maximum range for a 90% probability detection, $R_{max}$, was in excess of 235 meters. This exceeds the desired maximum range of 200 meters, and assumes a vehicular sized radar cross section and worse case atmospheric losses of 8 dB. Hence, range requirements using this approach exceeded initial requirements. Described radars have more than adequate maximum range performance, and may give an improved signal to noise ratio (SNR) for certain targets.

In some examples, switching between beams may induce phase transients, and these transients pass through the IF filter and are subject to its settling time characteristic. The baseband (IF) filter bandwidth used may be at least N times the single beam bandwidth. The data can be band-limited using a digital filter, and down-sampled to prevent aliasing. A wide bandwidth filter that settles in 1/Nth the time of a single-beam filter should give adequate performance.

Examples of the present invention include a multiple beam phased array antenna, with a three segment chirp pulse for each beam. Examples of the present invention have improved Doppler resolution, which is important for detecting slow moving objects (such as pedestrians and vehicles starting from rest), target vehicles with low velocities relative to the subject vehicle, during stop-and-go vehicle operation, and the like.

Tracker/association complexities can be reduced by reducing the velocity variance. Further, the described example approaches aids in the resolving targets within the same beam, and this is important for vehicular radar as beam widths are typically around 6 degrees. The described approach may not limit range resolution. The desired filter view update rate (such as an update rate of 20 ms) can be maintained within the near-range collision avoidance zone.

The phased array antenna may operate in a sum-difference operation mode for improved angle accuracy, assuming that the phase and amplitude rates of the phase antenna can be updated sufficiently quickly. The update rate for complex beam weights may need to be increased for some phased array antenna configurations.

A three segment up/down/flat chirp modulation as described is not guaranteed to resolve all range and Doppler ambiguities, particularly for distant vehicles and small relative velocities. However, the performance was found to be adequate for vehicular approach and allow significantly improved pedestrian detection. In some cases, small velocity differences between distant fast moving cars may not be resolved. Assuming a Doppler detection resolution of approximately 1 kph, the range for resolving two vehicles with identical relative velocities, 3 meters apart, may be in the range of tens of meters for closing velocities as low as 36 kph.

Examples of the present invention include various types of Doppler radar, including phased array radar, DBF radar, and continuous wave radar.

The invention is not restricted to the illustrative examples described above. Examples described are not intended to limit the scope of the invention. Changes therein, other combinations of elements, and other applications will occur to those skilled in the art.

Having described our invention, we claim:

1. An apparatus, the apparatus being a radar apparatus comprising:
   a chirp signal generator, generating a chirp waveform, the chirp waveform having at least three chirp segments, including a first chirp segment with an increasing frequency, a second chirp segment with a decreasing frequency, and a third chirp segment with a constant frequency;
   a single transmitter receiving the chirp waveform and generating a plurality of N transmitted beams with a beam sample sequence frequency of $f_s$ and a time delay between each transmitted beam of $1/Nf_s$, each transmitted beam of the plurality of N transmitted beams having the chirp waveform and the plurality of N transmitted beams being multiplexed during the first chirp segment;
   a single receiver, receiving an echo signal from and induced by each of the plurality of N transmitted beams, each echo signal having an echo frequency;
   a frequency difference analyzer, measuring a frequency difference between the echo frequency and a transmission frequency; and
   an electronic control circuit, receiving frequency difference data from the frequency difference analyzer,
   the chirp waveform giving a frequency modulation of the transmission frequency of each transmitted beam in the increasing frequency chirp segment and each transmitted beam in the decreasing frequency chirp segment,
   the frequency difference between each echo signal and transmission beam being determined every $1/f_s$ seconds such that frequency difference data is obtained multiple times during each chirp segment for each of the plurality of N transmitted beams,
   the apparatus being a Doppler radar having a field of view, the electronic control circuit being operable to use the frequency difference data to determine a relative speed as low as approximately 1 kph and a range up to 200 m for an object within the field of view,
   the apparatus being a vehicle radar configured for attachment to a vehicle.

2. The apparatus of claim 1, the transmission frequency increasing linearly with time during the increasing frequency chirp segment, decreasing linearly with time during the decreasing frequency chirp segment, and not varying with time during constant frequency chirp segment.

3. The apparatus of claim 1, the chirp waveform extending over a revisit time of the transmitted beam.

4. The apparatus of claim 3, the revisit time being in the range 1 ms-100 ms.

5. The apparatus of claim 4, the revisit time being in the range 10 ms-30 ms.

6. The apparatus of claim 5, the frequency difference analyzer determining the frequency difference between the transmission frequency and the associated echo frequency for each transmitted beam during each segment of the chirp signal or a time-delayed copy thereof.

7. The apparatus of claim 1, the apparatus being a continuous-wave Doppler radar.

8. An apparatus, the apparatus being a radar apparatus comprising:
   a chirp signal generator, generating a chirp waveform, the chirp waveform having at least three chirp segments, including a first chirp segment with an increasing frequency, a second chirp segment with a decreasing frequency, and a third chirp segment with a constant frequency;
   a single transmitter receiving the chirp waveform and generating a plurality of N transmitted beams with a beam sample sequence frequency of $f_s$ and a time delay between each transmitted beam of $1/Nf_s$, each transmitted beam of the plurality of N transmitted beams having the chirp waveform and the plurality of N transmitted beams being multiplexed during the first chirp segment;
   a single receiver, receiving an echo signal from and induced by each of the plurality of N transmitted beams, each echo signal having an echo frequency; and a frequency difference analyzer, measuring a frequency difference between the echo frequency and a transmission frequency, the chirp waveform giving a frequency modulation of the transmission frequency of each transmitted beam in the increasing frequency chirp segment and each transmitted beam in the decreasing frequency chirp segment, the transmission frequency increasing linearly with time during the increasing frequency chirp segment, decreasing linearly with time during the decreasing frequency chirp segment, and not varying with time during constant frequency chirp segment, the frequency difference between each echo signal and the transmission signal being determined every $1/f_s$ seconds such that frequency difference data is obtained multiple times during each chirp segment for each of the plurality of N transmitted beams to determine a relative speed as low as approximately 1 kph and a range up to 200 m for an object within a field of view, the apparatus being a continuous wave Doppler radar configured for attachment to a land vehicle.

9. The apparatus of claim 8, the chirp waveform extending over a revisit time of the transmitted beam.

* * * * *